(12) United States Patent
Roberge

(10) Patent No.: US 10,927,707 B2
(45) Date of Patent: Feb. 23, 2021

(54) DIFFUSER CASE HEAT SHIELDS

(71) Applicant: UNITED TECHNOLOGIES CORPORATION, Farmington, CT (US)

(72) Inventor: Gary D. Roberge, Tolland, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 116 days.

(21) Appl. No.: 16/213,395

(22) Filed: Dec. 7, 2018

(65) Prior Publication Data

US 2020/0182088 A1 Jun. 11, 2020

(51) Int. Cl.
*F01D 25/14* (2006.01)
*F01D 25/00* (2006.01)

(52) U.S. Cl.
CPC ............ *F01D 25/14* (2013.01); *F01D 25/005* (2013.01); *F05D 2220/32* (2013.01); *F05D 2300/177* (2013.01)

(58) Field of Classification Search
CPC ...... F04D 29/44; F04D 29/441; F04D 29/444; F04D 29/445; F04D 29/448; F04D 29/54; F04D 29/541; F04D 29/542; F04D 29/544; F04D 29/548; F04D 29/5893; F01D 9/00; F01D 9/02; F01D 9/04; F01D 9/041; F01D 25/005; F01D 25/12; F01D 25/14; F01D 25/24; F01D 5/14; F01D 5/147; F01D 5/28; F01D 5/286; F01D 11/005; F23R 3/04
See application file for complete search history.

(56) References Cited

U.S. PATENT DOCUMENTS

| 9,628,382 | B2 | 4/2017 | Birrittella et al. |
| 2005/0039459 | A1* | 2/2005 | Ackermann ............ F01D 25/08 60/752 |
| 2010/0061846 | A1 | 3/2010 | Herbst et al. |
| 2010/0316484 | A1* | 12/2010 | Jasko .................... F01D 11/001 415/1 |

(Continued)

FOREIGN PATENT DOCUMENTS

| EP | 3431710 A1 | 1/2019 |
| WO | 2012158070 A1 | 11/2012 |
| WO | 2014105599 A1 | 7/2014 |

OTHER PUBLICATIONS

European Search Report for European Application No. 19214262.8 dated Apr. 20, 2020.

*Primary Examiner* — Igor Kershteyn
*Assistant Examiner* — Elton K Wong
(74) *Attorney, Agent, or Firm* — Carlson Gaskey & Olds, PC

(57) ABSTRACT

A gas turbine engine includes a high pressure compressor disposed about a central longitudinal axis, a combustor, and a diffuser case. The diffuser case includes an outer ring providing a first platform and an inner ring providing a second platform. The first platform and the second platform are axially between the high pressure compressor and the combustor with respect to the central longitudinal axis. A plurality of circumferentially spaced struts extend radially from the first platform to the second platform and each include first and second circumferential sides. A plurality of heat shields are disposed on a leading edge defined at a forward end of a respective one of the plurality of struts.

18 Claims, 9 Drawing Sheets

(56) References Cited

U.S. PATENT DOCUMENTS

| | | | |
|---|---|---|---|
| 2014/0219808 A1* | 8/2014 | Drozdenko | F04D 29/324 |
| | | | 416/224 |
| 2015/0044046 A1 | 2/2015 | Shteyman et al. | |
| 2015/0345330 A1* | 12/2015 | Budnick | F01D 25/24 |
| | | | 415/177 |
| 2016/0186573 A1* | 6/2016 | McKaveney | F01D 5/3007 |
| | | | 416/220 R |
| 2017/0254206 A1* | 9/2017 | Schetzel | F01D 5/187 |
| 2018/0010457 A1 | 1/2018 | Chabane et al. | |
| 2019/0010807 A1* | 1/2019 | Pouzadoux | F04D 29/023 |

* cited by examiner

DIFFUSER CASE HEAT SHIELDS

STATEMENT REGARDING FEDERALLY SPONSORED RESEARCH OR DEVELOPMENT

This invention was made with Government support awarded by the United States. The Government has certain rights in this invention.

BACKGROUND

This application relates to diffuser cases for gas turbine engines, and more particularly to heat shields for diffuser cases.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The compressed air from the compressor section may then pass through a diffuser section. The diffuser has an expanding cross sectional area in the direction of the airflow to decrease the velocity and increase the static pressure of the air. This prepares the air for entry into a combustion section at low velocity to permit proper mixing with fuel. The diffuser section may be provided by a diffuser case.

SUMMARY

A gas turbine engine according to an example of the present disclosure includes a high pressure compressor disposed about a central longitudinal axis, a combustor, and a diffuser case. The diffuser case includes an outer ring providing a first platform and an inner ring providing a second platform. The first platform and the second platform are axially between the high pressure compressor and the combustor with respect to the central longitudinal axis. A plurality of circumferentially spaced struts extend radially from the first platform to the second platform, and each include first and second circumferential sides. A plurality of heat shields are disposed on a leading edge defined at a forward end of a respective one of the plurality of struts.

In a further example according to any of the foregoing examples, each of the plurality of heat shields include a first extension portion and a second extension portion. The first extension portion extends aft to a first end, the second extension portion extends aft to a second end, and the first and second end are spaced axially forward from a trailing edge of the strut.

In a further example according to any of the foregoing examples, the first platform and the second platform bound a portion of a core flow path of the gas turbine engine.

In a further example according to any of the foregoing examples, the high pressure compressor includes an exit guide vane which includes a first vane platform and a second vane platform. The first platform contacts the first vane platform, and the second platform contacts the second vane platform.

In a further example according to any of the foregoing examples, each of the plurality of heat shields includes a radially inner portion that extends to cover a lip which extends radially inward from the second platform.

In a further example according to any of the foregoing examples, the radially inner portion is received in a pocket in the lip.

In a further example according to any of the foregoing examples, each of the plurality of heat shields includes a radially outer portion providing a curved outer surface.

In a further example according to any of the foregoing examples, the curved surface is a concave surface that curves inward as it extends radially outward and axially aft.

In a further example according to any of the foregoing examples, each of the plurality of struts includes an internal cavity.

In a further example according to any of the foregoing examples, at least one of the plurality of heat shields and the plurality of struts includes at least one pedestal to provide at least one passageway between each of the plurality of heat shields and the plurality of struts.

In a further example according to any of the foregoing examples, the internal cavities and a respective one of the at least one passageway are in fluid communication through cooling holes in the plurality of struts.

In a further example according to any of the foregoing examples, a lip extends radially inward from the second platform and provides a first flange and a second flange, and each of the plurality of heat shields is disposed on the first flange and second flange.

In a further example according to any of the foregoing examples, each of the plurality of heat shields is formed of a nickel alloy.

In a further example according to any of the foregoing examples, the first portion includes a nose portion, the first and second extension portions extend aft from the nose portion, and the nose portion is forward of the leading edge of a respective one of the plurality of struts.

In a further example according to any of the foregoing examples, each of the plurality of heat shields is received in a recess of the respective one of the plurality of struts.

In a further example according to any of the foregoing examples, the distance from the trailing edge to the first end has a first axial length, the plurality of struts each have a second axial length, and the first axial length is 25-80% of the second axial length.

In a further example according to any of the foregoing examples, the distance from the trailing edge to the first end has a third axial length, and the third axial length is 25-80% of the second axial length.

In a further example according to any of the foregoing examples, the radially outermost point of the heat shield is radially inward of the first platform at the leading edge.

In a further example according to any of the foregoing examples, the radial distance at the leading edge from the first platform to the second platform defines a first radial height, and the radial distance from the first platform to the radially outermost point of the heat shield is a second radial height, and the second radial height is about 5-80% of the first radial height.

A gas turbine engine according to an example of the present disclosure includes a high pressure compressor disposed about a central longitudinal axis, a combustor, a diffuser case including an outer ring providing a first platform and an inner ring providing a second platform. The first platform and the second platform are axially between the high pressure compressor and the combustor with respect to the central longitudinal axis. The first platform and the second platform bound a portion of a core flow path of the gas turbine engine. The high pressure compressor includes an exit guide vane which includes a first vane platform and a second vane platform. The first platform contacts the first vane platform, and the second platform contacts the second vane platform. A plurality of circumferentially spaced struts extend radially from the first platform to the second platform and each include first and second circumferential sides. Each of the plurality of struts includes an internal cavity and a plurality of heat shields, each disposed on a leading edge of a respective one of the plurality of struts. Each of the plurality of heat shields include a first extension portion and a second extension portion. The first extension portion extends aft to a first end, the second extension portion extends aft to a second end, and the first and second end are spaced axially forward from a trailing edge of the strut. Each of the plurality of heat shields includes a radially inner portion that extends to cover a lip which extends radially inward from the second platform, and the radially inner portion is received in a pocket in the lip. A radially outer portion provides a curved outer surface, and the curved surface is a concave surface that curves inward as it extends radially outward and axially aft.

These and other features may be best understood from the following specification and drawings, the following of which is a brief description.

DETAILED DESCRIPTION

Figure 1:
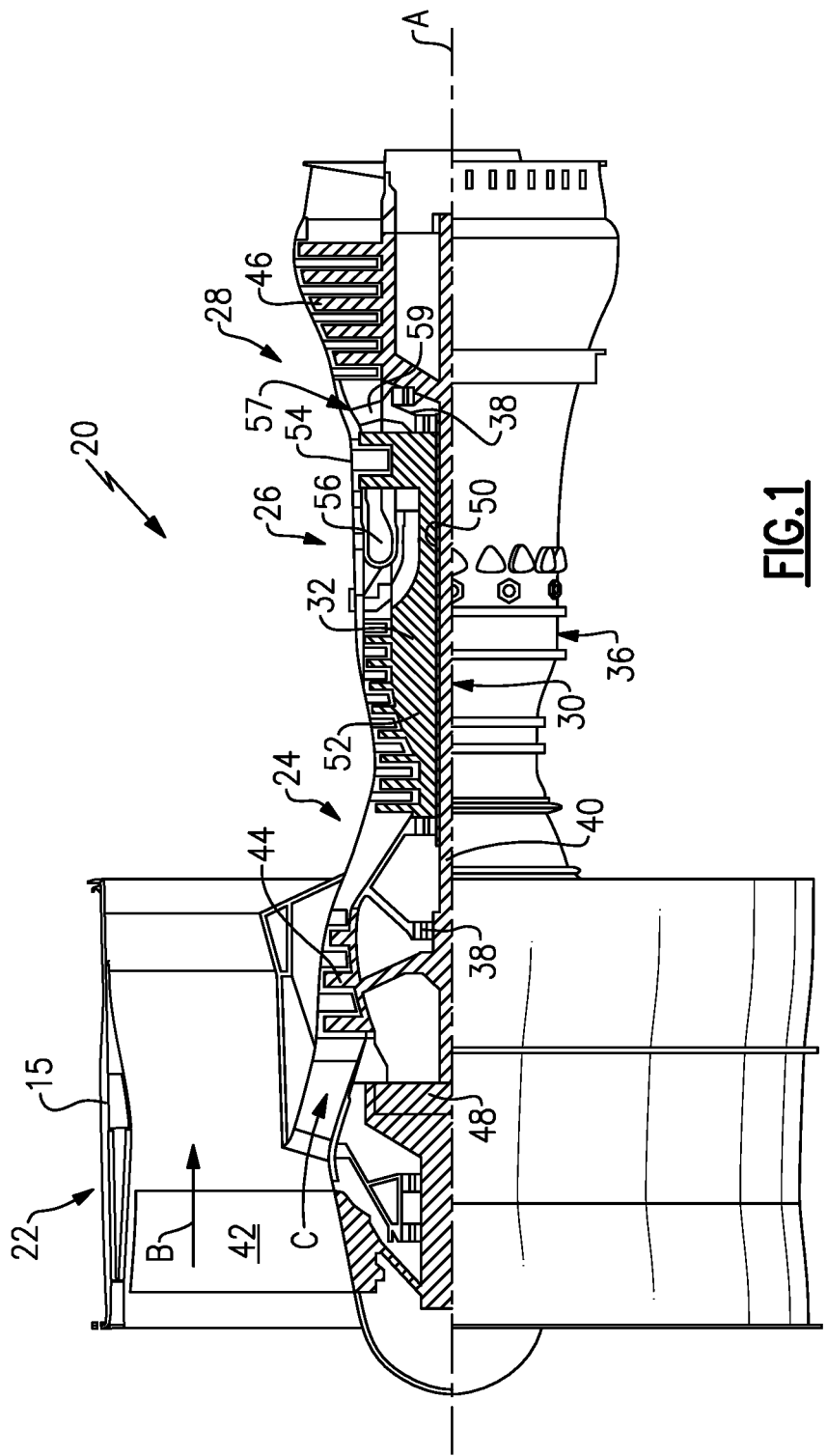
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram °R})/(518.7°R)]^{0.5}$. The "Low corrected fan tip speed" as disclosed herein according to one non-limiting embodiment is less than about 1150 ft/second (350.5 meters/second).

Figure 2:
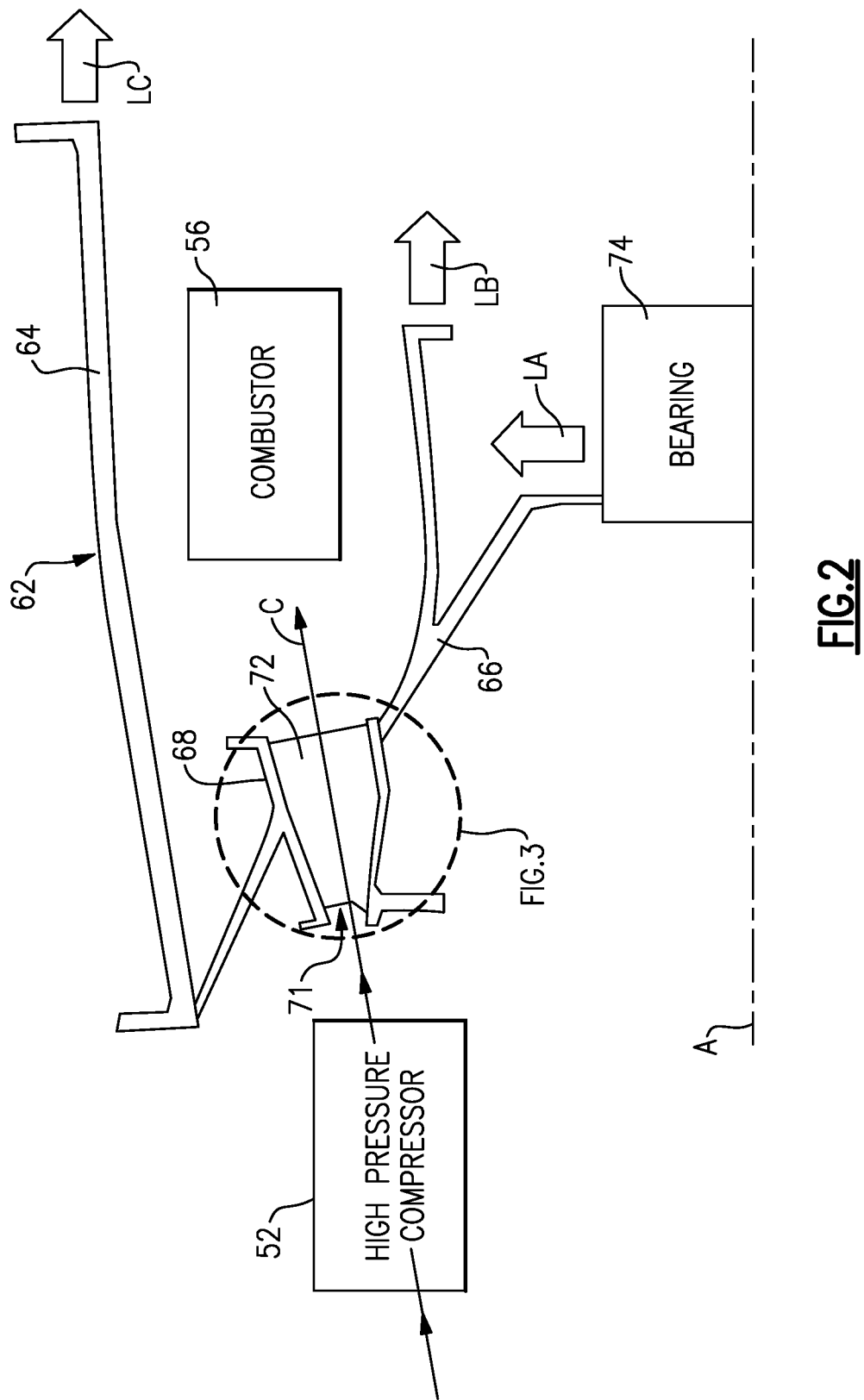
FIG. 2 schematically illustrates a cross sectional view of an example diffuser case of the gas turbine engine of FIG. 1.

FIG. 2 schematically illustrates an example diffuser case 62 including an outer diameter ("OD") ring 64 radially outward of an inner diameter ("ID") ring 66. The OD ring provides a circumferential platform 68, and the ID ring 66 provides a circumferential platform 70. The platforms 68, 70 bound an axial portion of the core flow path C and form a diffusing passage 71 therebetween. The diffusing passage 71 is located axially between the high pressure compressor 52 and the combustor 56 of the engine 20. The diffusing passage 71 has an expanding cross sectional area in the direction of the core flow path C to decrease the velocity and increase the static pressure of the air before reaching the combustor 56.

One or more circumferentially spaced struts 72 extend from the platform 68 to the platform 70, such that the flow path in the diffusing passage 71 is defined circumferentially between the struts 72. Although one strut 72 is shown in the cross-section of FIG. 2, in some examples, 18-24 equally circumferentially spaced struts 72 are utilized. In some examples, the diffuser case 62, including the OD ring 64, ID ring 66, and struts 72 are formed of a single metal casting. Other materials and arrange may be utilized. Although the structure shown in FIG. 2 is prior art, Applicant has identified structural challenges.

As shown schematically, the ID ring 66 provides support to the radial load of a rotor support bearing 74 radially inward of the combustor 56. The bearing 74 provides a load LA on the diffuser case 62. The diffuser case 62 may support additional axial loads, including loads LB and LC from areas of the engine 20 aft (downstream of with respect to the direction of the core flow path C) of the diffuser case 62, in some examples. In some examples, the loads LB and LC are from static components in the high pressure turbine 54 pulling the diffuser case aft. The transfer of these loads LA, LB, and LC may affect local stress and resulting component life. Local stress and resulting component life may also be affected by steady state and transient thermal conditions. In some examples, the OD ring 64, ID ring 66, and struts 72 have differing thermal response rates, depending on whether the engine 20 is accelerating or decelerating.

Figure 3:
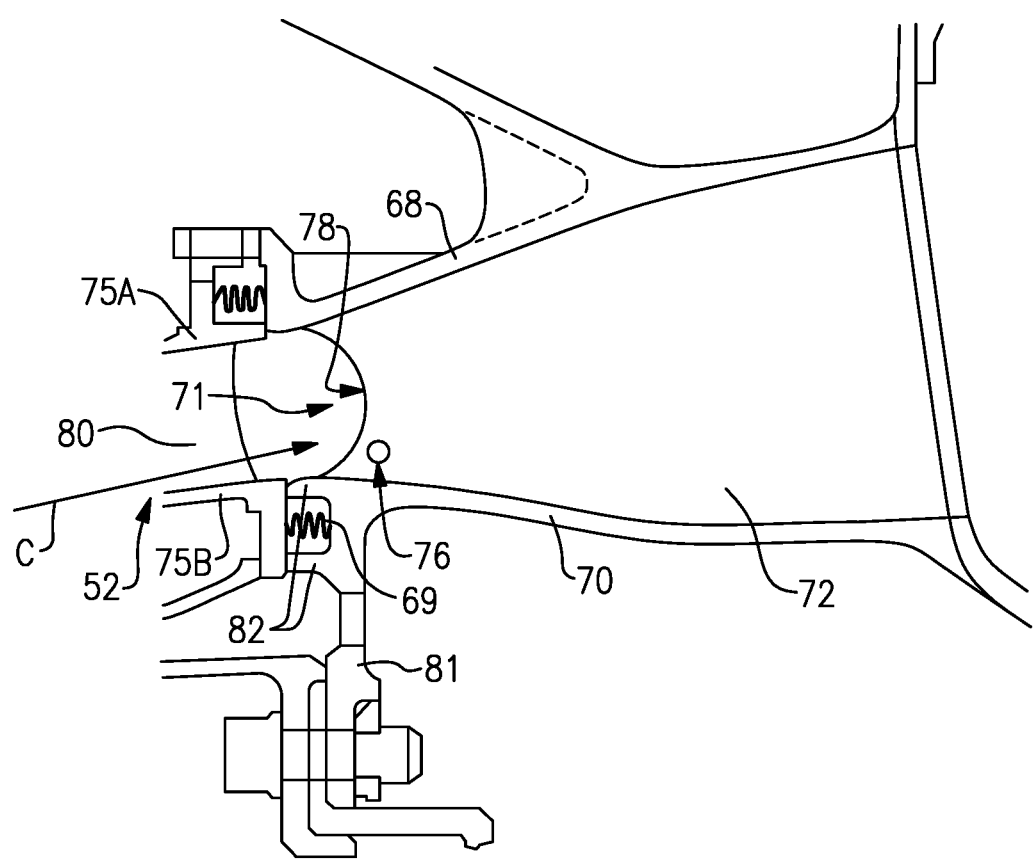
FIG. 3 schematically illustrates an enlarged cross sectional view of a portion of the example diffuser case of FIG. 2.

FIG. 3 illustrates an enlarged view (with reference to FIG. 2) of the diffusing passage 71. As a result of the various loads and time dependent thermal conditions, the strut 72 may be subject to thermal mechanical fatigue, including at the zone 76 near the leading edge 78 of the strut 72. Strut 72 responds thermally at a different rate than surrounding structure due to proximity of and exposure to core flow C combined with mass that is low in relation to adjacent outer ring 64 and platform 68 and inner ring 66 and platform 70. As a result, the strut 72 operates in conditions where it alternately pushes on adjacent rings and platforms, or is be pulled by these components as the engine undergoes acceleration and deceleration impacting overall pressure (compression) ratio and accompanying gas path temperature of flow C. Combined with externally imparted loads LA and LB, local regions of high internal component loading can be formed at the zone 76 and may be exacerbated by local changes in diffuser case 62 radial stiffness as load transitions from rings and platforms into relatively thin strut 72. The location of zone 76 may also be influenced by the increased stagnation temperature and heat transfer effects of core flow C as it interacts with the leading edge 78 of strut 72. As shown, the leading edge 78 of the strut 72 is aft of an exit guide vane 80 of the high pressure compressor 52 with respect to the core flow path C, and the platform 68 contacts an outer platform 75A of the exit guide vane 80, and the platform 70 contacts an inner platform 75B of the exit guide vane 80. An inner support flange lip 81 extends radially inward from the platform 70. One or more flanges 82 may extend axially forward (upstream of with respect to the direction of the core flow path C) from the lip 81. The leading edge is axially opposite the trailing edge 60 of the strut.

Figure 4:
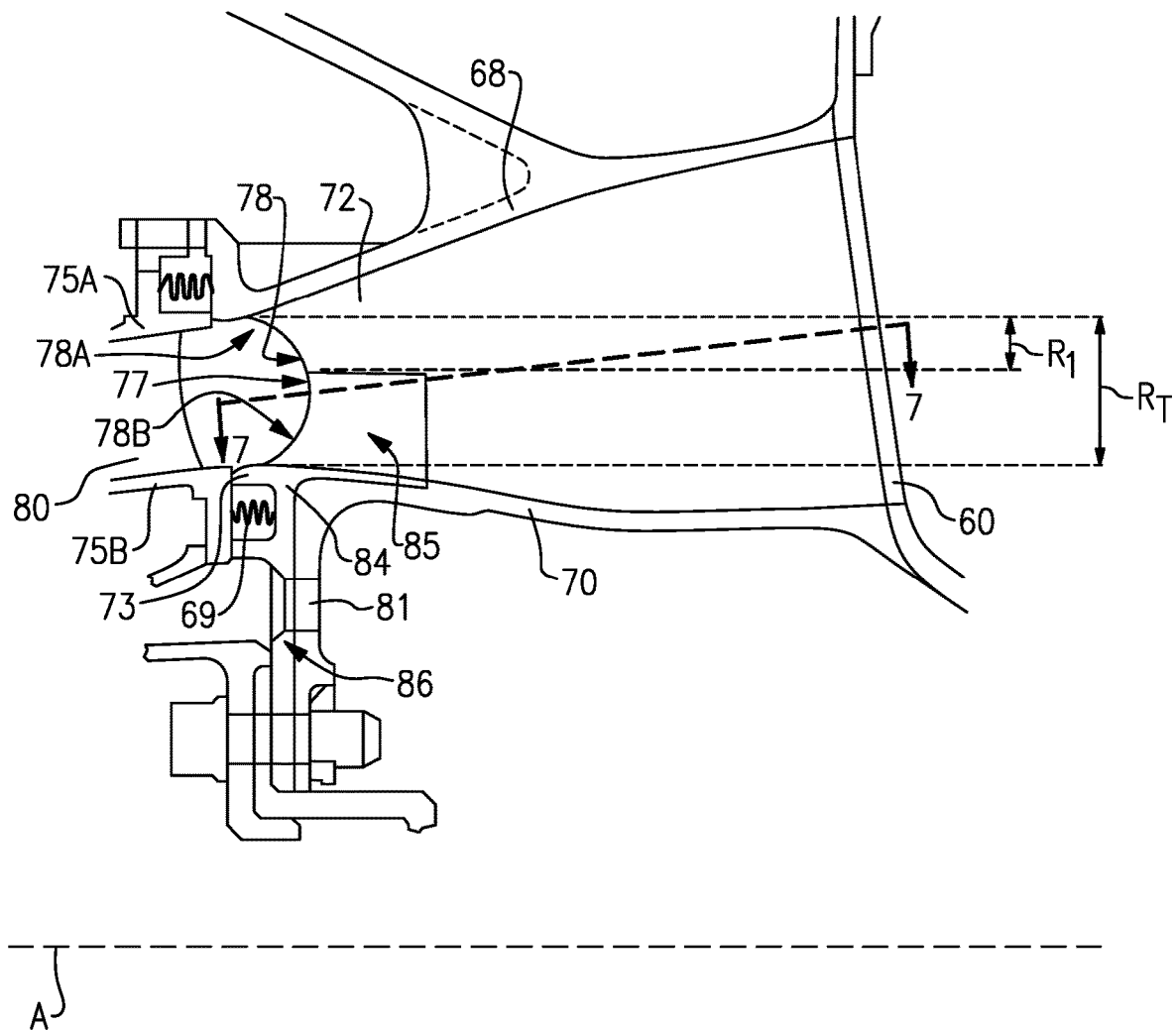
FIG. 4 illustrates a cross sectional view of a portion of the example diffuser case of FIG. 3 with an example heat shield.

FIG. 4 illustrates a heat shield 84 including a radially outer portion 85 located on the leading edge 78 of the strut 72 and a radially inner portion 86 located on the lip 81. The example heat shield 84 is a separate component from the diffuser case 62, and its contouring may be modified to be compliant with various aerodynamic requirements. In the example, the radially outer portion 85 provides a concave curved outer surface 77. This radially outer portion 85 may include use of a thermal barrier coating in some examples (discussed further below) in the flowpath surface and/or interior surface (adjacent to strut 72) to slow thermal response of outer portion 85 and underlying shielded region of strut 72 to provide additional thermal protection. As shown in the cross section, the surface 77 curves inward as it extends radially outwardly and axially aft. In other examples the curvature may be reversed or there may be no leading edge curvature. The surface 77 extends axially forward to an axially extending shelf 73. The shelf 73 may contact the adjacent platform 75B of the exit guide vane 80 along with seal 69. The radially inner portion 86 extends radially inward from the shelf 73.

In some examples, the heat shield 84 is a nickel alloy, some examples being Waspaloy or Haynes alloy 230. In some examples, the diffuser case 62 is a nickel alloy, some examples being Waspaloy or Haynes alloy 230.

The example strut 72 has a radial height RT (the radial distance between the platforms 68,70 at the leading edge 78 of the strut 72) at the leading edge 78 of the strut 72. A radially outer portion 78A of the leading edge 78 of the strut 72 having a radial height R1 (the radial distance between the platform 68 and the radially innermost point of the portion 78A) is uncovered, and a radially inner portion 78B of the leading edge 78 of the strut 72 is covered. In some examples, height R1 is about 5-80% of the height RT. In one example, height R1 is about 45% of the height RT. In some examples, the portion 78A is uncovered to allow for installation and assembly accessibility. Leaving the portion 78A may also reduce vibration created by the overhung mass of the heat shield 84. In other examples, the entire radial height of the strut 72 may be covered.

Figure 5:
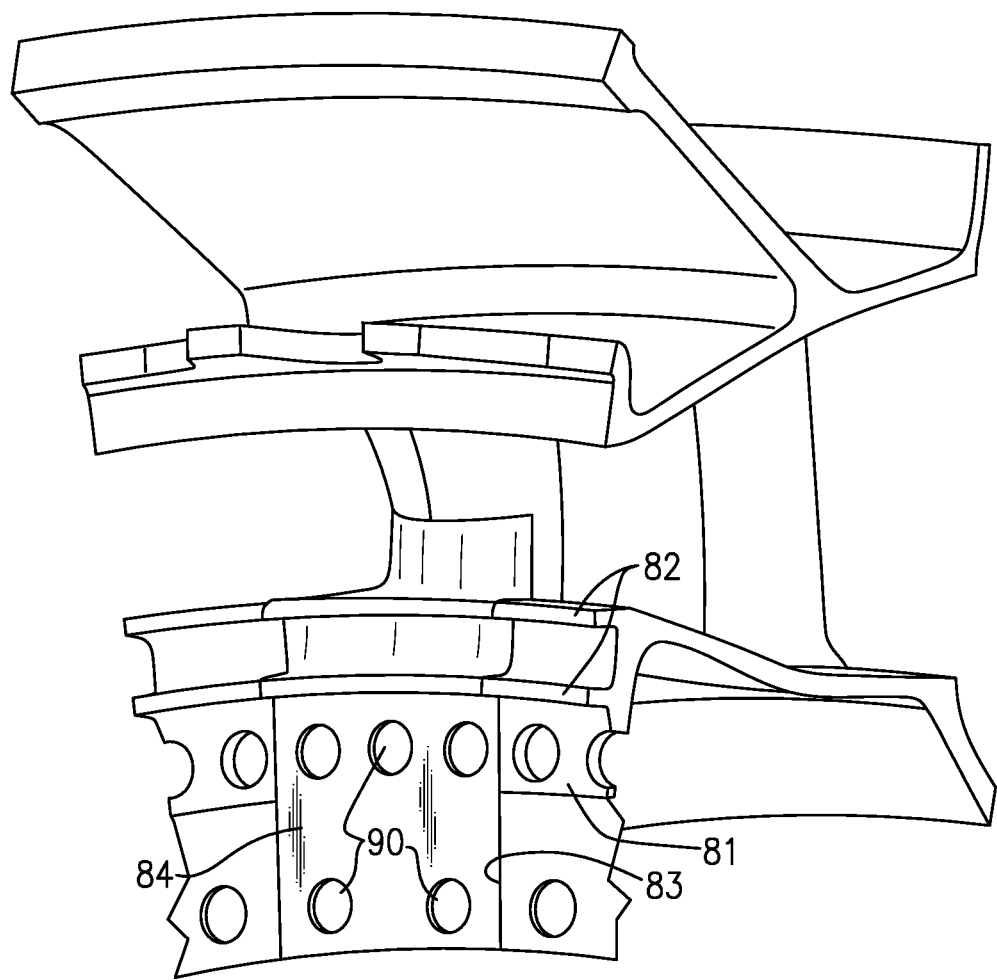
FIG. 5 illustrates an isometric view of a portion of the diffuser case of FIGS. 2-4 with the example heat shield of FIG. 4.

FIG. 5 illustrates an isometric view, when looking aft, of a heat shield 84 over a strut 72 and a circumferential portion of the diffuser case 62. In the example shown, the heat shield 84 is seated in a pocket 83 machined into the lip 81. The heat shield 84 and lip 81 may provide a substantially flush surface. The heat shield 84 may be attached to the lip 81 using the flanges 82. A person of ordinary skill in the art having the benefit of this disclosure would recognize that other methods of attachment may be utilized in some examples. The heat shield 84 may include one or more openings 90 to accommodate bolts or other fasteners in some examples. As shown, a single heat shield 84 is utilized for a single strut 72, such that there is a 1:1 relationship for heat shields 84 and struts 72 in the example diffuser case 62.

Figure 6:
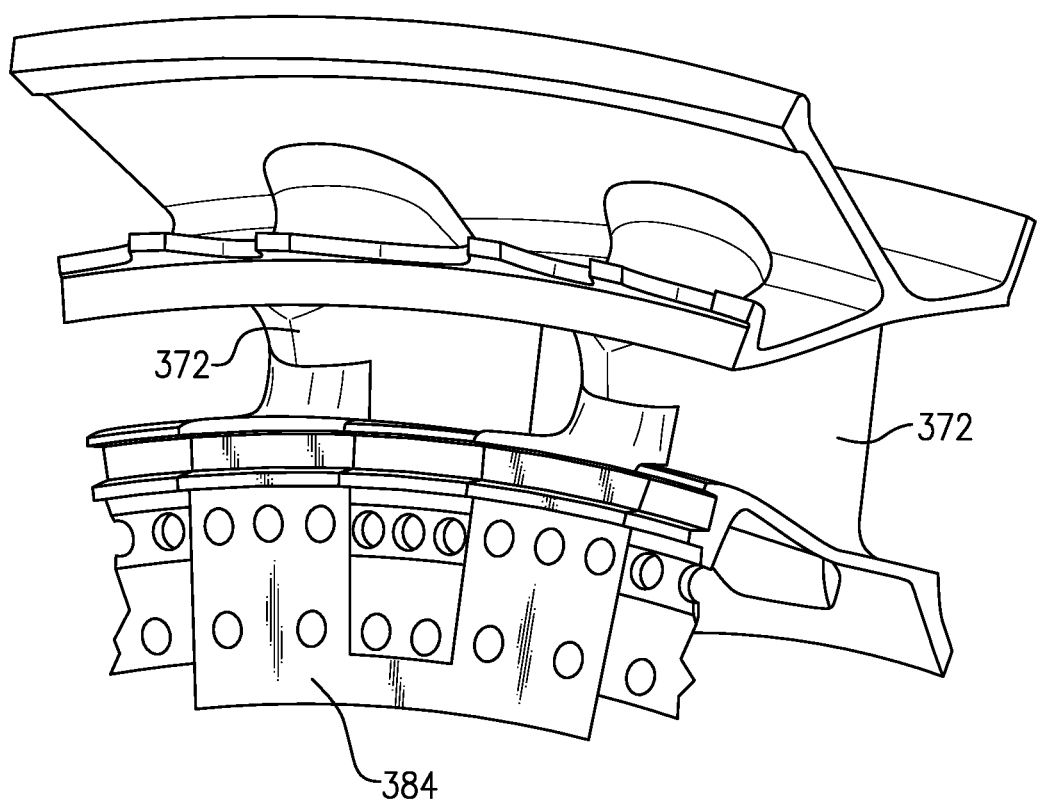
FIG. 6 illustrates another example heat shield.

As shown in FIG. 6, alternatively, one heat shield 384 may be designed to cover two or more struts 372. Like reference numerals identify corresponding or similar elements throughout the drawings.

Figure 7:
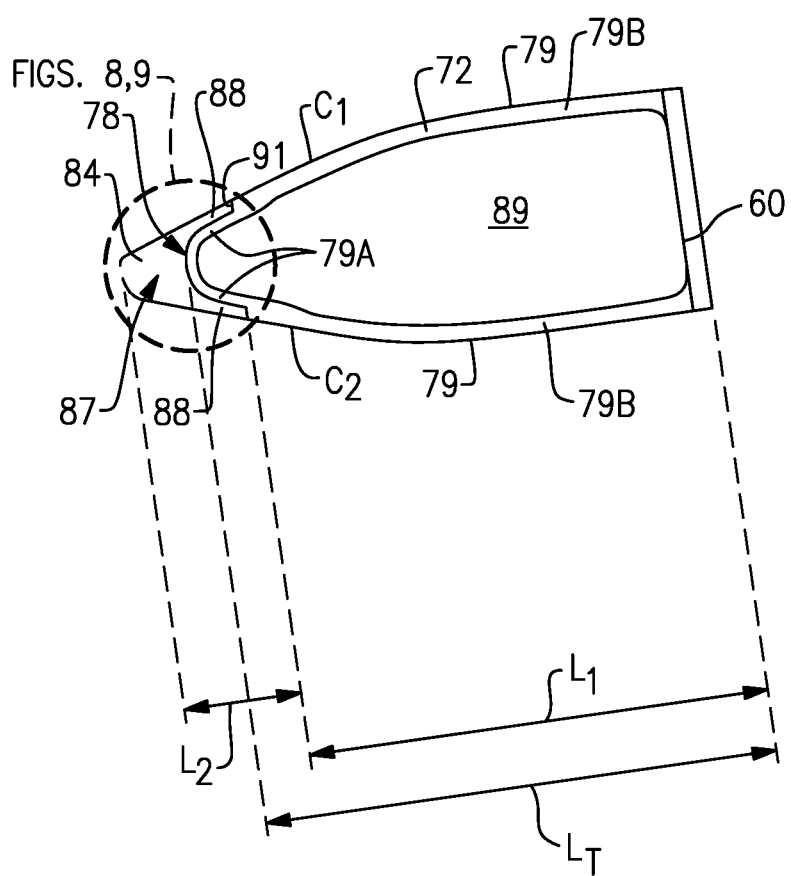
FIG. 7 illustrates a cross sectional view of the portion of the example diffuser case with the example heat shield of FIG. 4, with reference to the cross section shown in FIG. 4.

FIG. 7 illustrates the example heat shield 84 at the cross section through the radially outer portion 85 shown in FIG. 4. The example heat shield 84 includes a nose portion 87 and extension portions 88 extending axially aft from the nose portion 87. The nose portion 87 is forward of the leading edge 78 of the strut 72, and the extension portions 88 extend across opposing circumferential sides C1, C2 of the strut 72. The example extension portions 88 cover forward surfaces 79A of the circumferential sides C1, C2, but leave aft surfaces 79B of the circumferential sides C1, C2 uncovered. In some examples, the axial length L1 of the uncovered aft surface 79B is 5-90% of the total axial length LT of the strut 72 from the leading edge 78 to the trailing edge 60. In one example, the length L1 is about 85% of the length LT. Leaving the portions 79B uncovered may reduce vibration created by the overhung mass of the heat shield 84. An axial length L2 of the heat shield 84 may be 10-80% of the length LT in some examples. In some examples, the length L2 is about 20% of the length LT.

The example struts 72 are hollow such that they each form an internal cavity 89. The leading edge 78 may provide a recess 91 contoured to receive the heat shield 84, such that the heat shield 84 and aft surfaces 79B on each circumferential side C1, C2 of the strut 72 firm flush surfaces.

Figure 8A:
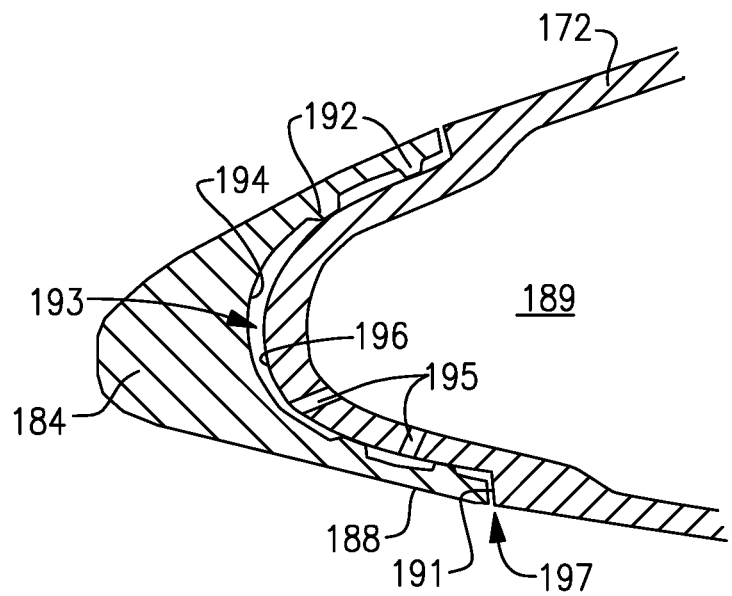
FIG. 8A illustrates a cross sectional view of a third example heat shield.

FIG. 8A illustrates an enlarged view (with reference to FIG. 7) of an example heat shield 184. One or more pedestals 192 may extend from an interior surface 194 of the heat shield 184 to form a passageway 193 between the heat shield 184 and the strut 172 and limit direct thermal conductivity between the heat shield 184 and the strut 172. Alternatively or additionally, the strut 172 may provide pedestals. One or more cooling holes 195 may extend from the internal cavity 189 through the outer surface 196 of the strut 172 in some examples, such that the cavity 189 and passageway 193 are in fluid communication. Two cooling holes 195 on one side of the strut 172 are shown for illustrative purposes, but more or fewer cooling holes 195 on one or both sides of the strut 172 may be utilized. The end of one or both extensions 188 may be spaced from the recess 191 to provide one or more discharges 197 for the passageway 193.

Figure 8B:
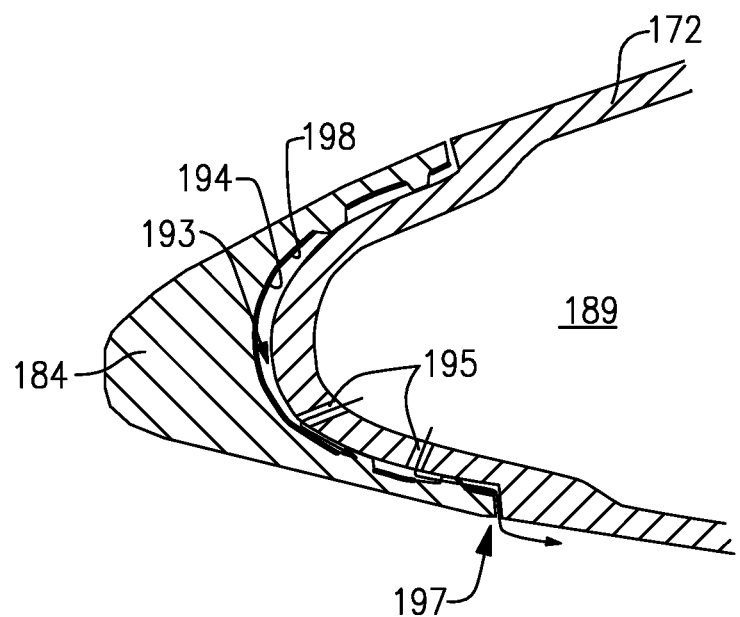
FIG. 8B schematically illustrates cooling of the third example heat shield of FIG. 8A.

FIG. 8B schematically illustrates an example cooling flow for the example heat shield 184 of FIG. 8A. In some examples, where the temperature within the cavity 189 is less than the external temperature within the diffusing section, adequate pressure may be applied to the cavity 189 to flow cooling air from the cavity 189 through the cooling holes 195, through the passageway 193, and out the discharge 197, as shown schematically. Additional thermal control may therefore be achieved by active cooling of the heat shield 184 and strut 172 interface. A thermal barrier coating 198 may be applied to the interior surface 194 in some examples. Alternatively or additionally, thermal barrier coatings 198 may be utilized on the struts 172 and/or on the exterior surface of 194. In some examples, the thermal barrier coating 198 may be magnesium stabilized zirconium oxide.

Figure 9:
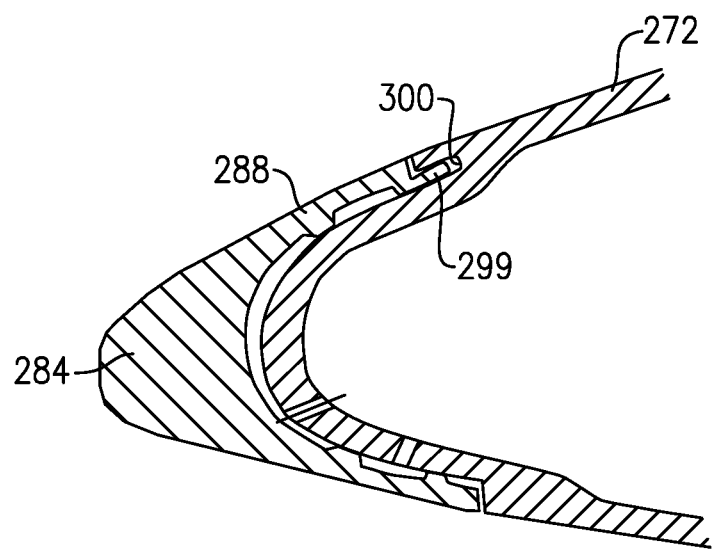
FIG. 9 illustrates a cross sectional view of a fourth example heat shield.

FIG. 9 illustrates an example heat shield 284 substantially similar to the heat shield 184 of FIGS. 7A and 7B. The extension portion 288 of the heat shield 284 may include a retention lip 299 received in a slot 300 of the strut 272 to prevent or control relative motion of the edges of extension portion 288. In some examples, the retention lip 299 and/or slot 300 may be intermittent with discontinuous lips and slots and offset radially to allow insertion and fixturing through relative radial motion between components required to overcome the draft angles and geometry shown in FIG. 9. Although the retention lip 299 is shown on one extension 288 in the example for illustrative purposes, one or both of the extension portions 288 may include a retention lip 299 in some examples.

The example heat shields 84/184/284 help to change the operating metal temperature magnitude and/or time dependent thermal transient response of the struts 72. By changing the operating metal temperature response characteristic of the struts 72, the example heat shields 84/184/284/384 protect against thermal mechanical fatigue of the diffuser case 62, including at the zone 76 of the strut 72 (see FIG. 3), without having to change the loads applied to the diffuser case 62. The heat shields 84/184/284/384 react to the transient temperature of the strut 72. By protecting a portion of the strut 72 from direct interaction the core flow path at zone 76, the thermal response is slowed and the cyclic stress is reduced during repeated acceleration and deceleration of the engine 20. This reduction in time-dependent stress results in an improvement in local fatigue life at the component life limiting location 76.

Stated another way, a gas turbine engine 20 may include a high pressure compressor 52 disposed about a central longitudinal axis and a combustor 56. A diffuser case 62 includes an outer ring 64 providing a first platform 68 and an inner ring 66 providing a second platform 70. The first platform 68 and the second platform 70 are axially between the high pressure compressor 52 and the combustor 56 with respect to the central longitudinal axis. A plurality of circumferentially spaced struts 72 extend radially from the first platform 68 to the second platform 70. A plurality of heat shields 84, each disposed on a leading edge 78 defined at a forward end of a respective one of the plurality of struts 72. Each of the plurality of heat shields 84 includes a first extension portion 88 and a second extension portion 88. The first extension portion 88 extends aft to a first end, the second extension portion 88 extends aft to a second end, and the first and second end are spaced axially forward from a trailing edge 60 of the strut 72.

Although the different embodiments are illustrated as having specific components, the embodiments of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
   a high pressure compressor disposed about a central longitudinal axis;

a combustor; and
a diffuser case including
an outer ring providing a first platform,
an inner ring providing a second platform, wherein the first platform and the second platform are axially between the high pressure compressor and the combustor with respect to the central longitudinal axis,
a plurality of circumferentially spaced struts extending radially from the first platform to the second platform and each including first and second circumferential sides, and
a plurality of heat shields, each disposed on a leading edge defined at a forward end of a respective one of the plurality of struts, wherein a radial distance at the leading edge from the first platform to the second platform defines a first radial height, and a radial distance from the first platform to the radially outermost point of the heat shield is a second radial height, and the second radial height is 5-80% of the first radial height.

2. The gas turbine engine as recited in claim 1, wherein each of the plurality of heat shields includes a first extension portion and a second extension portion, wherein the first extension portion extends aft to a first end, the second extension portion extends aft to a second end, and the first and second end are spaced axially forward from a trailing edge of the strut.

3. The gas turbine engine as recited in claim 1, wherein the first platform and the second platform bound a portion of a core flow path of the gas turbine engine.

4. The gas turbine engine as recited in claim 3, wherein the high pressure compressor includes an exit guide vane including a first vane platform and a second vane platform, wherein the first platform contacts the first vane platform, and the second platform contacts the second vane platform.

5. The gas turbine engine as recited in claim 1, wherein each of the plurality of struts includes an internal cavity.

6. The gas turbine engine as recited in claim 5, wherein at least one of the plurality of heat shields and the plurality of struts includes at least one pedestal to provide at least one passageway between each of the plurality of heat shields and the plurality of struts.

7. The gas turbine engine as recited in claim 6, wherein the internal cavities and a respective one of the at least one passageway are in fluid communication through cooling holes in the plurality of struts.

8. The gas turbine engine as recited in claim 1, wherein a lip extends radially inward from the second platform and provides a first flange and a second flange, and each of the plurality of heat shields is disposed on the first flange and second flange.

9. The gas turbine engine as recited in claim 1, wherein each of the plurality of heat shields is formed of a nickel alloy.

10. The gas turbine engine as recited in claim 1, wherein each of the plurality of heat shields is received in a recess of the respective one of the plurality of struts.

11. The gas turbine engine as recited in claim 1, wherein the radially outermost point of the heat shield is radially inward of the first platform at the leading edge.

12. A gas turbine engine, comprising:
a high pressure compressor disposed about a central longitudinal axis;
a combustor; and
a diffuser case including
an outer ring providing a first platform,
an inner ring providing a second platform, wherein the first platform and the second platform are axially between the high pressure compressor and the combustor with respect to the central longitudinal axis,
a plurality of circumferentially spaced struts extending radially from the first platform to the second platform and each including first and second circumferential sides, and
a plurality of heat shields, each disposed on a leading edge defined at a forward end of a respective one of the plurality of struts, wherein each of the plurality of heat shields includes a radially inner portion that extends to cover a lip extending radially inward from the second platform, a radial distance at the leading edge from the first platform to the second platform defines a first radial height, and a radial distance from the first platform to the radially outermost point of the heat shield is a second radial height, and the second radial height is 5-80% of the first radial height.

13. The gas turbine engine as recited in claim 12, wherein the radially inner portion is received in a pocket in the lip.

14. The gas turbine engine as recited in claim 12, wherein each of the plurality of heat shields includes a radially outer portion providing a curved outer surface.

15. The gas turbine engine as recited in claim 14, wherein the curved surface is a concave surface that curves inward as it extends radially outward and axially aft.

16. The gas turbine engine as recited in claim 12, wherein the radially inner portion provides first and second flanges, and a radially inwardly extending portion radially inward of the first and second flanges.

17. The gas turbine engine as recited in claim 16, wherein the radially inwardly extending portion provides one or more openings to accommodate one or more fasteners.

18. A gas turbine engine, comprising:
a high pressure compressor disposed about a central longitudinal axis;
a combustor; and
a diffuser case including
an outer ring providing a first platform,
an inner ring providing a second platform, wherein the first platform and the second platform are axially between the high pressure compressor and the combustor with respect to the central longitudinal axis, wherein the first platform and the second platform bound a portion of a core flow path of the gas turbine engine, wherein the high pressure compressor includes an exit guide vane including a first vane platform and a second vane platform, wherein the first platform contacts the first vane platform, and the second platform contacts the second vane platform,
a plurality of circumferentially spaced struts extending radially from the first platform to the second platform and each including first and second circumferential sides, wherein each of the plurality of struts includes an internal cavity, and
a plurality of heat shields, each disposed on a leading edge of a respective one of the plurality of struts, wherein each of the plurality of heat shields includes a first extension portion and a second extension portion, wherein the first extension portion extends aft to a first end, the second extension portion extends aft to a second end, and the first and second end are spaced axially forward from a trailing edge of the strut,
each of the plurality of heat shields includes a radially inner portion that extends to cover a lip extending radially inward from the second platform, and the radially inner portion is received in a pocket in the lip, a radially outer portion providing a curved outer surface, the curved surface is a concave surface that curves inward as it extends radially outward and axially aft wherein a radial distance at the leading edge from the first platform to the second platform defines a first radial height, and a radial distance from the first platform to the radially outermost point of the heat shield is a second radial height, and the second radial height is 5-80% of the first radial height.

* * * * *